Patented July 29, 1947

2,424,860

UNITED STATES PATENT OFFICE 2,424,860

INSECTICIDAL COMPOSITIONS

Alva V. Snider, Richmond, and John L. Van Winkle, Berkeley, Calif., assignors to Shell Development Company, San Francisco, Calif., a corporation of Delaware No Drawing. Application June 30, 1944, Serial No. 543,030

12 Claims. (Cl. 167—22)

This invention relates to new and novel compounds which are particularly suitable for killing noxious insects and the like. More specifically, the invention is concerned with insecticidal compositions containing the esters of oximes of substituted unsaturated carbocyclic compounds, particularly the alkylated cyclo-olefinic oximes.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, and free from injurious effect and offensive odor to human beings and tendency to stain walls, fabrics, etc.

It is an object of the present invention to provide an insecticidal composition which is highly toxic to insects but of low toxicity to man and other warm-blooded animals. Another object is to provide new insecticidal compositions which can be prepared from readily available domestic and inexpensive materials. A further object is to provide an improved insecticidal composition containing a fast-acting synthetic toxicant which is stable to light. A further object of this invention is to provide an activator for toxic plant extracts such as pyrethrum and derris resin or rotenone in insecticidal compositions.

We have found that non-benzenoidal (i. e. aliphatic and alicyclic) oxime esters of carboxylic acids, especially lower fatty acids are particularly effective and highly active insecticidal toxicants. Preferred are the ketoxime esters, especially alicyclic oxime esters in which the carbon atom of the ketoxime group is a member of the ring. Of the olefinic carbocyclic oxime esters which are preferred, those having only one double bond in the ring are usually more suitable than those having more than one double bond in the ring. While the present invention contemplates esters of both mono- and poly-oximes, the mono-oxime esters are generally more desirable.

The non-benzenoidal oxime esters are suitably prepared by esterification of the desired oximes with carboxylic acids, preferably the lower fatty acids, such as formic, acetic, propionic, butyric, pentanoic, hexanoic, hexenoic, heptanoic, etc., acids as well as higher molecular weight fatty acids, such as capric, lauric, palmitic, stearic, oleic, linoleic, etc. Other suitable acids include polybasic carboxylic acids, such as malonic, succinic, maleic, glutaric, allylmalonic, etc., acids, substituted acid such as monochloroacetic, trichloroacetic acids, and the like.

Suitable non-benzenoidal oximes, which may be used to form the oxime esters of the present invention, include, for example, aliphatic oximes, such as diethyl ketoxime, dipropyl ketoxime, butyl aldoxime, etc. oximes of diketones such as diacetyl, acetonyl acetone, etc., and especially higher ketoximes having at least 8 carbon atoms, such as dibutyl ketoxime, ethyl hexyl ketoxime, diamyl ketoxime, propyl lauryl ketoxime, etc. Preferred are the alicarbocyclic oximes, such as, for example, cyclopentanone ketoxime, cyclohexanone ketoxime, cyclohexadione di-ketoximes, etc. and especially the cyclo-olefinic oximes, such as cyclopentenone ketoxime, cyclohexenone ketoxime, cycloheptenone ketoxime, cyclohexadienone ketoxime, cyclohexadienedione di-ketoximes, etc. A particularly effective group of oxime esters are formed from the ketoximes of poly-alkyl cyclic ketones, which have two alkyl groups on one ring carbon. Such alkylated cyclic ketones are represented by isophorone and its homologues, which latter are commonly known as "homo-isophorone." These cyclic ketones, from which the oximes and present oxime esters are obtained, may be prepared from a variety of condensable ketones such as aliphatic, alicyclic, aliphatic-aromatic, or aliphatic-alicyclic ketones. As examples of these condensable ketones, there may be named such compounds as acetone, methyl ethyl ketone, methyl propyl ketones, diethyl ketone, methyl isopropyl ketone, methyl cyclohexyl ketone, ethyl cyclopentyl ketone, cyclohexanone, cyclopentanone, alpha-methyl cyclopentanone, methyl nonyl ketone, etc., as well as unsaturated ketones, saturated and unsaturated ketols, and the like. These cyclic ketones may be further condensed to bicyclic ketones, and thereafter the resultant ketones converted to ketoximes and thence to oxime esters. Another group of suitable alkylated cyclo-olefinic oximes may be prepared, for example, by Diels-Alder reaction of cyclic mono- and poly-olefinic ketones with conjugated dienes and then to the oxime by reaction with hydroxyl-amine or the like. Compounds of this type include, for example, 6,7-dimethyldelta⁶-octalone ketoxime (the intermediate ketone being obtained by reaction of 2,3-dimethyl butadiene and cyclohexene-3-one), 6,8-dimethyl-delta⁶-octalone ketoxime, etc. For example, di-isophorone ketoxime may be formed from di-isophorone.

Also, substituted aliphatic and cyclic saturated and unsaturated oxime esters may be used which also have in the molecule one or more of the following groups: sulfo, oxyalkyl, amine, hydroxy, carboxy, amide, mercapto, keto, ester, lactone, lactam, ketal, acetal, halogen, halohydrin, epoxide, cyanohydrin, azo, diazo, thiazo, oxazo, thioether, thioimino, cyano, thiocyano, etc.

Further, cyclic oxime esters of the heterocyclic type may also be used. For example, included in the ring or rings may be such atoms or groups as

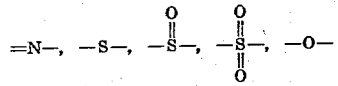

etc. As example of such compounds there may be mentioned the lower fatty acid esters of the oximes of the reaction products of acetic, pentanedioic, or like anhydrides with methyl-, dimethyl-, and trimethyl-piperidine and the like, esters of alkylated (e. g., propyl, hexyl, etc.) pyrone oximes, maleic acid ester of furfuraldehyde oxime, the fatty acid ester, such as the propionate, of the oxime of dehydroacetic acid or of ester derivatives (e. g., stearic ester) of dehydroacetic acid, or the like, etc.

The non-benzenoidal oxime esters, preferably the alicyclic ketoxime esters, and particularly the carboxylic acid esters of oximes of isophorone and its homologues, either alone or in combination with other active or inactive substances, may be applied to plants, animals, fabrics and the like, by spraying, dusting, pouring, dipping, etc., in the form of concentrated liquids, solutions, suspensions, dusting powders, and the like, containing such concentration of the active principle as is most suited for the particular purpose at hand. They may be applied, for example, in the form of dilute solutions, in a suitable solvent or mixture of solvents, containing, for instance, petroleum distillate, lignite tar oils, paraffin oils, naphthenes, chlorinated hydrocarbons, chlorinated ethers, acetone, fenchyl and bornyl alcohols, mono- and polyhydric alcohols, glycol ethers, or the like or mixtures thereof.

The present compounds may be advantageously used in combination with other insecticides or fungicides such as pyrethrum, derris resins, rotenone, nicotine, lime-sulphur, Bordeaux mixture, copper sulfate, copper carbonates, sulphur, mercury compounds, sodium, calcium and lead arsenates, iron sulfate, phenol, paradichlorobenzene unsaturated chlorides, higher unsaturated amides, alkene sulfides, thiuram sulfides, thiocyanates, thiocyano esters, isothiocyanates, ethylene glycol ether of pinene, butyl mesityl oxide oxalate, poly halogen compounds such as dichloro-acetonitrile hexa chloro benzene, 1,1-di-parachloro-phenyl 2,2,2-trichloro ethane, etc., unsaturated cyclic ketols, such as di-isophorone and its homologues, obtained by condensation of lower ketones, such as acetone, methyl ethyl ketone, etc., according to U. S. Patent 2,307,482, and the like.

As will be readily apparent, the most desirable non-benzenoidal oxime ester and solvent, or solvent mixture, or combination with other active and inactive ingredients, will depend considerably upon the particular use for which the material is intended.

For use in household insecticides, the non-benzenoidal oxime ester is preferably dissolved in a light hydrocarbon oil, such as highly refined, odorless kerosene or kerosene distillate with or without the addition of other insecticides and sprays. Ordinarily from about 1% to 25% and preferably from 2% to 8% of the present toxicants are used in such sprays.

For use in sprays, such as horticultural spray oils, there may be added emulsifying agents, such as partial esters of polyhydric alcohols, e. g., glycerol mono-oleate, polyethylene glycol mono laurate, palmitate, stearate, oleate, etc., wherein the polyethylene glycol may be, for example, octaethylene glycol, various soaps, alkali metal salts of sulfuric acid mono esters and organic sulfuric acids and the like.

When solutions of the non-benzenoidal oxime esters in odorless base kerosene are placed on filter paper and exposed to air, the liquid evaporates leaving substantially no stain behind, which feature is of particular advantage in household insecticides.

The present compounds may also be mixed with or absorbed by finely divided solid materials, such as wood flour, talc, clay, bentonite, sulphur, and carbon black, and using dusting insecticides.

Modified Peet-Grady tests were made with the non-benzenoidal oxime ester of the present invention. The general test is fully described in the 1940 "Blue Book," published by the publisher of "Soap and Sanitary Chemicals" periodical, on pages 193 to 197, as the large group method. Briefly, the test as practiced consists of releasing 100 to 150 flies in an air-conditioned case 6 x 6 x 6 feet and spraying them with 6 ml. of insecticide. After 10 minutes' exposure the number of flies which are incapacitated or "knocked down" is noted and all flies transferred to a cage and allowed to recuperate in fresh air for 24 hours, when the dead flies are counted. For the purpose of this study the official Peet-Grady procedure was not followed in calculating the results, but only the percentages knocked down at 10 minutes and killed at 24 hours were recorded. The results obtained by testing in the above manner isophorone oxime acetate in highly refined, odorless kerosene with added pyrethrum and, as a standard, pyrethrum alone in said kerosene are given in the following table:

| Test No. | Amount of Isophorone Oxime Acetate | Amounts of Pyrethrum Extract | Per cent 10 minute knockdown | Per cent 24 hour kill |
|---|---|---|---|---|
| | Per cent volume | Per cent volume | | |
| 1 | | 5 | | 33 |
| 2 | 5 | 5 | 95 | 63 |

Besides the control of houseflies (*Musca domestica*), the compositions containing the present non-benzenoidal oxime esters of carboxylic acids may be used for eradicating or controlling various pests, such as insects, e. g., aphids, diabrotica, red spiders, thrips, etc., bacteria and fungi, such as Aspergillus, Penicillium, *Scherobium rolsii*, etc.

We claim as our invention:

1. An insecticidal composition comprising a mineral oil and an alicyclic mono-ketoxime ester of an aliphatic carboxylic acid.

2. An insecticidal composition comprising a mineral oil and an alicyclic ketoxime ester of an aliphatic carboxylic acid, wherein the carbon atom of the mono-ketoxime group is in the ring.

3. The process of controlling insects, bacteria and fungi, comprising the steps of exposing them to an alicyclic mono oxime ester of an aliphatic carboxylic acid, having the carbon atom of the oxime group in the ring and at least one olefinic double bond in the ring.

4. An insecticidal composition comprising a mineral oil and a lower fatty acid ester of an alkylated cyclohexenone mono-ketoxime.

5. An insecticidal composition comprising a mineral oil and a lower fatty acid ester of an alkylated cyclohexenone mono-ketoxime having two alkyl groups on the ring carbon atom in the 5 position, one alkyl group on the ring carbon in the 3 position, and one double bond in the ring in the 2 position.

6. An insecticidal composition comprising a mineral oil and a lower fatty acid ester of an alkylated cyclo-mono-olefinic mono-ketoxime.

7. An insecticidal composition comprising a fatty acid ester of an alicyclic mono-ketoxime and an insecticidal plant extract.

8. An insecticidal composition comprising a fatty acid ester of an alicyclic mono-ketoxime and pyrethrum.

9. A household insecticide comprising a light hydrocarbon oil and isophorone oxime acetate.

10. An insecticidal composition comprising a mineral oil and a lower fatty acid ester of an alicyclic olefinic monoketoxime.

11. An insecticidal composition comprising a carrier selected from the group consisting of mineral oil and a finely divided solid adsorptive substance and a compound selected from the group consisting of unsaturated and saturated aliphatic and alicyclic mono-oxime esters of aliphatic carboxylic acids.

12. An insecticidal composition comprising a mineral oil and a compound selected from the group consisting of unsaturated and saturated aliphatic and alicyclic mono-oxime esters of aliphatic carboxylic acids.

ALVA V. SNIDER.
JOHN L. VAN WINKLE.

REFERENCES CITED

The following references are of record in the file of this patent:

UNITED STATES PATENTS

| Number | Name | Date |
|---|---|---|
| 2,302,384 | Ter Horst | Nov. 17, 1942 |
| 2,307,482 | Ballard | Jan. 5, 1943 |
| 2,363,928 | Ballard | Nov. 28, 1944 |